3,272,714
METHOD OF PRODUCING RIBONUCLEIC ACID

Kiyoshi Watanabe, Takasago, Japan, assignor to Kanegafuchi Chemical Industry Company, Limited, Osaka, Japan, a corporation of Japan
No Drawing. Filed Dec. 9, 1963, Ser. No. 329,305
Claims priority, application Japan, July 2, 1963, 34,835
1 Claim. (Cl. 195—28)

This invention relates to methods of producing ribonucleic acid.

The international chemical abbreviation for ribonucleic acid is —RNA— and the same will sometimes hereinafter be so abbreviated.

Unless otherwise stated, increments of measure, used in this specification, such as units of percentage or parts, are units by weight.

It has been known for some time that a main part of yeast nucleic acid is RNA. Recently it has been discovered that RNA itself, apart from its presence in yeast, is useful in seasoning agents, nutritive foods, medicines, etc. RNA has furthermore recently occupied an important position biochemically, and numerous reports have been made concerning its biosynthetic mechanism.

Yeast is and has been regarded as the principal source of supply of RNA. However, previously, RNA has been viewed as merely a constituent element of yeast, and no one has paid any particular attention to increasing the RNA yield of a given quantity of yeast. The primary object of this invention is to obtain RNA on a commerical scale by carrying out yeast culture in such a manner as to render the production of RNA commercially feasible.

Various kinds of yeasts, for bakery items, foodstuffs, etc., have been commercially produced, and the principal techniques for the production of such yeasts on a commercial basis is well understood. I was not satisfied with the yield of RNA which had been derived from previous yeast cultures, and have experimented and investigated effects of the addition of various kinds of inorganic and organic compounds to saccharine media in an effort to increase the yield of RNA. I discovered that the addition of zinc ion to the culture liquid greatly increased the rate of RNA formation and the yield of RNA relative to the volume of supplied and consumed sugar without having any appreciable adverse effect on the yeast growth rate or yield. It is therefore a further object of my invention to facilitate the production of RNA by the addition of zinc ion to the culture liquid.

I recognize that others have previously noted various relations between the zinc ion and the growth metabolisms of micro-organisms. According to these results obtained by others, zinc ion has an important stimulating effect on the growth of yeast; is an essential composition as a co-enzyme for various kinds of dehydrogenases; and likewise has the effcet of increasing the rate of sugar consumption. However the effects of zinc ion on the formation of RNA up to the time of my experiments and investigations, were quite unknown. I discovered that by combining a concentration of zinc ion and that of phosphoric acid, with proper coefficient of oxygen absorption rate, the formation of RNA would be markedly increased.

The coefficient of oygen absorption rate is internationally chemically abbreviated as —Kd—. The term "Kd" as used in this test means the result to be obtained by the method set forth in the report by Yamada et al. in volume 27, pages 704–708, of the 1956 reports of the Japanese Agricultural Chemical Society.

It has been previously recognized that phosphoric acid has a positive effect in promoting the rate of RNA yield. Such yields of RNA which have been previously obtained, by use of phosphoric acid, have, however, not been sufficient to render the same commercially feasible. I discovered that by suitably combining the zinc ion concentration with a phosphoric acid concentration, the yield of RNA cauld be promoted to such an extent as to provide a commercially practicable process for the production of RNA.

It has likewise previously been recognized that a high Kd value results in an increased yield rate of yeast and growth rate of yeast. I discovered that the addition of a zinc ion, when the Kd value is high, manifestly increases the yield of RNA.

The general results of my experimentations and investigations is that when the three factors—zinc ion concentration, phosphoric acid concentration, and Kd are combined, the yield rate and the formation rate of RNA will be promoted to the extent whereby RNA may be profitably produced on an industrial basis.

I recognize that there are many substances which have been effectively utilized for accelerating the growth rate of yeast, such as various kinds of vitamins, amino acids, nitrogen sources, etc., however, these substances do not produce an effect which will elevate the rate of RNA yield in relation to sugar. Prior knowledge in the culture of yeast has therefore failed to produce any process whereby the yield rate of RNA relative to sugar and the rate of RNA formation could be practically carried out on an industrial scale.

Optimum results in the production of RNA are obtained when zinc ion concentration in the culture liquid is over 0.25 p.p.m.; phosphoric acid is added to the culture liquor in the amount of 0.15%, by weight, or above; and Kd is over $1.0 \times 10^{-5}$.

For example, well known kinds and concentrations of sugar; nitrogen sources; potassium salts; magnesium salts; inorganic substances, other than zinc; culture temperatures; pH; Kd; and combinations thereof, or various kinds of vitamins, amino-acids, and other additives for growth acceleration, etc., as well as known culture conditions which will have effects of growth acceleration, are compatible with my process and may be utilized under appropriate conditions.

Since RNA is normally accumulated in the body of yeast, it is generally the practice to indicate the progress of yeast culture by the content of RNA, the amount of yeast formed, the growth rate, the yield rate, etc., relative to supplied sugar or consumed sugar. However, in this specification, in the case of culture of batch systems, the yield rate of RNA is judged by measuring and recording the RNA yield rate in relation to the consumed sugar, and the rate of RNA formed by the weight of RNA formed per unit volume of the liquor on the basis of time elapsed, respectively. As it is known that the formation of RNA is richest in the yeast growth period, the amount of yeast and the amount of residual sugar are also mentioned so as to facilitate the understanding of the growth curves.

The following description deals with the effects of zinc ion in sequence. As to zinc to be added, since it is usual that the pH of the culture is on the acid side, regardless of whether or not the zinc to be added is in a non-ionic condition, the desired results will be obtained with any composition of zinc, so long as such zinc composition is of a nature which can be ionized in the culture liquor.

In the culture results reported below, *Candida utilis* was used as the control yeast, and its yeast mash was added to the present culture liquor for 3%, then shake-culture or aeration-agitation culture was carried out on the batch system under regulated conditions so that the zinc ion concentration in the culture liquor would be 0.05 p.p.m., and also under an aerobic condition where the Kd value was $12.6 \times 10^{-6}$. This provided a control medium by which results of my experiments could be measured.

In Table 1, the progress of culture is mentioned with the culture experiments, in which various kinds of combined media prepared by addition of sodium citrate, asparagine, vitamins, and inorganic salts, including zinc ion were used.

It will be noted that although no significant difference appears between one media or the others in connection with the rate of formation of yeast, the yield rate, significant differences were witnessed between the media with no addition of inorganic salts and the media with addition of inorganic salts in respect of the rate of sugar consumption of yeast, and the rate of formation of RNA and the yield of RNA.

For example, in the case of a culture for 11 hours, an effect as high as 200% has been indicated in the yield rate of RNA, and an effect as high as 300% in the rate of formation. The effects of addition of the vitamins and others in the media with addition of inorganic salts may be noted to some extent, but this is relatively inconsequential.

Table 2 tabulates the experimental results attained when the 3 kinds of inorganic salts mentioned in Table 1 were added to synthetic media, individually or in combinations. Iron and copper ions have shown almost no effect, whereas the effect of the zinc ion was distinctive. For example, in a medium after a culture of 10 hours, the yield rate of RNA and the rate of RNA formed was indicated to be as high as 200% or more in comparison with the control.

As seen in the table, effects of zinc ion addition are elevated by mixing with copper ion or copper and iron ions.

TABLE 1

| Time elapsed | 9 Hours | | | | | 11 Hours | | | | |
| --- | --- | --- | --- | --- | --- | --- | --- | --- | --- | --- |
| Result | Residual Sugar (percent) | RNA Amount (mg./lit.) | RNA Yield (percent) | Amount of Yeast (percent) | RNA Content (percent) | Residual Sugar (percent) | RNA Amount (mg./lit.) | RNA Yield (percent) | Amount of Yeast (percent) | RNA Content (percent) |
| Medium No.: | | | | | | | | | | |
| 1 | 2.05 | 314 | 3.3 | 0.43 | 7.3 | 1.56 | 324 | 2.3 | 0.89 | 3.6 |
| 2 | 2.01 | 298 | 3.0 | 0.43 | 6.9 | 1.75 | 302 | 2.4 | 0.85 | 3.6 |
| 3 | 2.00 | 294 | 2.9 | 0.42 | 7.0 | 1.20 | 350 | 2.0 | 0.90 | 3.8 |
| 4 | 2.00 | 346 | 4.4 | 0.48 | 7.2 | 1.18 | 393 | 2.2 | 0.88 | 4.5 |
| 5 | 1.98 | 270 | 2.6 | 0.30 | 9.0 | 1.42 | 330 | 2.1 | 0.82 | 4.0 |
| 6 | 2.23 | 570 | 7.5 | 0.46 | 12.5 | 0.34 | 1,150 | 4.3 | 1.07 | 10.7 |
| 7 | 2.02 | 620 | 6.3 | 0.44 | 14.1 | 0.21 | 1,182 | 4.2 | 0.89 | 13.3 |
| 8 | 2.08 | 665 | 7.7 | 0.50 | 13.3 | <0.04 | 1,345 | 4.5 | 1.07 | 12.6 |
| 9 | 2.03 | 683 | 6.9 | 0.48 | 14.2 | <0.04 | 1,361 | 4.6 | 1.06 | 12.8 |

Note.—Composition of Respective Culture Medium—
Medium No.:
1. Fundamental medium: (Glucose 3.0%, $(NH_4)_2HPO_4$ 1.0%, $KH_2PO_4$ 0.06%, $MgSO_4 \cdot 7H_2O$ 0.05%).
2. Fundamental medium plus Sodium citrate 0.1%.
3. Fundamental medium plus Asparagine 0.25%.
4. Fundamental medium plus Vitamins of various kinds (Biotine 0.06 mg./lit., Calcium Pantothenate 1.5 mg./lit., Vitamin $B_1$ hydro-chloride 13.2 mg./lit., Pyridoxine 3.6 mg./lit.).
5. Fundamental medium plus Vitamins of various kinds plus Inositol 30 mg./lit.
6. Fundamental medium plus Inorganic salts of various kinds ($ZnSO_4 \cdot 7H_2O$ 6 mg./lit., $Fe(NH_4)_2 \cdot (SO_4)_2 \cdot 6H_2O$ 3 mg./lit., $CuSO_4 \cdot 5H_2O$ 0.3 mg./lit.).
7. Fundamental medium plus Inorganic salts of various kinds plus Vitamins of various kinds plus Inositol 30 mg./lit.
8. Medium (7) plus Asparagine 0.25%.
9. Medium (7) plus Asparagine 0.25% plus Sodium citrate 0.1%.

TABLE 2

| Time elapsed | 8 Hours | | | | | 10 Hours | | | | |
| --- | --- | --- | --- | --- | --- | --- | --- | --- | --- | --- |
| Result | Residual Sugar (percent) | RNA Amount (mg./lit.) | RNA Yield (percent) | Amount of Yeast (percent) | RNA Content (percent) | Residual Sugar (percent) | RNA Amount (mg./lit.) | RNA Yield (percent) | Amount of Yeast (percent) | RNA Content (percent) |
| Medium No.: | | | | | | | | | | |
| 1 | 2.36 | 233 | 3.7 | 0.36 | 6.4 | 1.85 | 259 | 2.3 | 0.58 | 4.5 |
| 2 | 2.10 | 431 | 4.9 | 0.47 | 9.2 | 1.70 | 539 | 4.1 | 0.62 | 8.7 |
| 3 | 2.10 | 423 | 4.8 | 0.33 | 13.0 | 1.75 | 521 | 4.2 | 0.58 | 9.0 |
| 4 | 2.20 | 475 | 5.9 | 0.38 | 12.5 | 1.78 | 617 | 5.0 | 0.67 | 9.2 |
| 5 | 2.02 | 237 | 2.4 | 0.34 | 7.0 | 1.56 | 263 | 1.9 | 0.65 | 4.0 |
| 6 | 2.15 | 268 | 3.1 | 0.35 | 7.6 | 1.75 | 237 | 1.9 | 0.56 | 4.2 |
| 7 | 2.21 | 237 | 3.0 | 0.38 | 6.3 | 1.52 | 280 | 1.9 | 0.59 | 4.7 |
| 8 | 2.00 | 302 | 3.0 | 0.42 | 7.2 | 1.68 | 151 | 1.2 | 0.59 | 2.6 |
| 9 | 2.10 | 241 | 2.7 | 0.45 | 5.4 | 1.51 | 302 | 2.0 | 0.69 | 4.4 |
| 10 | 1.85 | 225 | 1.9 | 0.44 | 5.1 | 1.52 | 215 | 1.5 | 0.60 | 3.6 |
| 11 | 2.13 | 500 | 5.8 | 0.49 | 10.3 | 1.25 | 777 | 4.5 | 0.78 | 10.0 |
| 12 | 1.90 | 582 | 5.3 | 0.54 | 10.8 | 0.95 | 825 | 4.0 | 0.88 | 9.4 |
| 13 | 2.10 | 354 | 3.9 | 0.45 | 7.8 | 1.10 | 358 | 1.9 | 0.71 | 5.0 |
| 14 | 2.10 | 604 | 6.7 | 0.53 | 11.4 | 0.77 | 1,035 | 4.7 | 0.99 | 10.5 |

Note.—Composition of Respective Media—
Medium No.:
1. Fundamental Medium (Glucose 3.0%, Urea 0.30%, Ammonium Sulphate 0.10%, $KH_2PO_4$ 0.15%, $MgSO_4 \cdot 7H_2O$ 0.05%, $CaCl_2 \cdot H_2O$ 0.02%).
2. Fundamental Medium plus $ZnSO_4 \cdot 7H_2O$ 3.0 mg./lit. (As Zn 0.7 p.p.m.)
3. Fundamental Medium plus $ZnSO_4 \cdot 7H_2O$ 12.0 mg./lit. (As Zn 2.7 p.p.m.).
4. Fundamental Medium plus $ZnSO_4 \cdot 7H_2O$ 48.0 mg./lit. (As Zn 10.9 p.p.m.)
5. Fundamental Medium plus $Fe(NH_4)_2(SO_4)_2 \cdot 6H_2O$ 2.0.
6. Fundamental Medium plus $Fe(NH_4)_2(SO_4)_2 \cdot 6H_2O$ 8.0.
7. Fundamental Medium plus $Fe(NH_4)_2(SO_4)_2 \cdot 6H_2O$ 32.0.
8. Fundamental Medium plus $CuSO_4 \cdot 5H_2O$ 0.3.
9. Fundamental Medium plus $CuSO_4 \cdot 5H_2O$ 1.2.
10. Fundamental Medium plus $CuSO_4 \cdot 5H_2O$ 4.8.
11. Fundamental Medium plus $ZnSO_4 \cdot 7H_2O$ 6.0 mg./lit. plus $Fe(NH_4)_2(SO_4)_2 \cdot 6H_2O$ 4.0 mg./lit.
12. Fundamental Medium plus $ZnSO_4 \cdot 7H_2O$ 6.0 mg./lit. plus $CuSO_4 \cdot 5H_2O$ 0.30 mg./lit.
13. Fundamental Medium plus $Fe(NH_4)_2(SO_4)_2 \cdot 6H_2O$ 4.0 mg./lit. plus $CuSO_4 \cdot 5H_2O$ 0.30 mg./lit.
14. Fundamental Medium plus $ZnSO_4 \cdot 7H_2O$ 6.0 mg./lit. plus $Fe(NH_4)_2 \cdot 6H_2O$ 4.0 mg./lit. plus $CuSO_4 \cdot 5H_2O$ 0.30 mg./lit.

Table 3 gives a general range of effective concentrations of zinc ion in synthetic media in the case of individual addition of zinc ion. As is clear from the table, the zinc ion concentration in the culture medium may be as low as 0.25 p.p.m., which relatively low concentration shows marked effects on the rate of formation in the yield of RNA as compared with the control medium containing only 0.05 p.p.m. of zinc ion.

As regards the upper limit of zinc ion concentration, I have determined no specific limitation. As shown in the table, in which a medium was utilized having a concentration of zinc ion in excess of 1,000 p.p.m., the same did not exhibit any particular obstructive effect. Zinc ion is therefore considered to remain effective over a broad range of concentrations higher than 0.25 p.p.m. As to the optimum effective concentration, I experimented with a broad range of concentrations, but was unable to reach a conclusion as to the optimum concentration of zinc ion. My experiments and investigations lead me to believe that virtually any reasonable concentration of zinc ion will accomplish the purposes of my invention, and I have therefore specified the zinc ion only at the lower limit, 0.25 p.p.m.

TABLE 3

| Time elapsed | 8 Hours | | | | | 10 Hours | | | | |
|---|---|---|---|---|---|---|---|---|---|---|
| Result | Residual Sugar (percent) | RNA Amount (mg./lit.) | RNA Yield (percent) | Amount of Yeast (percent) | RNA Content (percent) | Residual Sugar (percent) | RNA Amount (mg./lit.) | RNA Yield (percent) | Amount of Yeast (percent) | RNA Content (percent) |
| Medium No.: | | | | | | | | | | |
| 1 | 2.41 | 212 | 4.0 | 0.32 | 6.6 | 2.10 | 224 | 2.5 | 0.51 | 4.4 |
| 2 | 2.45 | 228 | 4.1 | 0.33 | 6.9 | 2.02 | 385 | 3.9 | 0.52 | 7.4 |
| 3 | 2.28 | 380 | 5.3 | 0.35 | 10.9 | 1.67 | 630 | 4.7 | 0.67 | 9.4 |
| 4 | 2.40 | 398 | 6.6 | 0.32 | 12.4 | 1.81 | 583 | 4.9 | 0.60 | 9.7 |
| 5 | 2.34 | 423 | 6.4 | 0.37 | 11.4 | 1.63 | 720 | 5.3 | 0.65 | 11.1 |
| 6 | 2.25 | 391 | 5.2 | 0.33 | 11.9 | 1.66 | 721 | 5.4 | 0.68 | 10.6 |
| 7 | 2.28 | 341 | 4.7 | 0.32 | 10.7 | 1.51 | 647 | 4.3 | 0.63 | 10.3 |
| 8 | 2.38 | 430 | 6.9 | 0.36 | 11.9 | 1.59 | 710 | 5.0 | 0.63 | 11.3 |
| 9 | 2.26 | 364 | 4.9 | 0.33 | 11.0 | 1.54 | 708 | 4.9 | 0.64 | 11.1 |
| 10 | 2.15 | 423 | 5.0 | 0.38 | 11.1 | 1.59 | 634 | 4.5 | 0.59 | 10.8 |
| 11 | 2.21 | 474 | 6.0 | 0.42 | 11.3 | 1.65 | 617 | 4.6 | 0.58 | 10.6 |
| 12 | 2.31 | 410 | 5.9 | 0.38 | 10.8 | 1.60 | 613 | 4.4 | 0.57 | 10.8 |
| 13 | 2.44 | 427 | 7.6 | 0.35 | 12.2 | 1.36 | 794 | 4.8 | 0.70 | 11.3 |
| 14 | 2.26 | 530 | 7.2 | 0.42 | 12.6 | 1.60 | 733 | 5.2 | 0.65 | 11.3 |

Note.—Composition of Respective Media:
Medium No.:
1. Fundamental Medium (Glucose 3.0%, Urea 0.30%, Ammonium Sulfate 0.10%, $KH_2PO_4$ 0.15%, $MgSO_4.7H_2O$ 0.05%, $CaCl_2.2H_2O$ 0.02%).
2. Fundamental Medium plus $ZnSO_4.7H_2O$ 0.55 mg./lit. (as Zn 0.125 p.p.m.).
3. Fundamental Medium plus $ZnSO_4.7H_2O$ 1.10 mg./lit. (as Zn 0.25 p.p.m.).
4. Fundamental Medium plus $ZnSO_4.7H_2O$ 1.65 mg./lit. (as Zn 0.37 p.p.m.).
5. Fundamental Medium plus $ZnSO_4.7H_2O$ 2.2 mg./lit. (as Zn 0.5 p.p.m.).
6. Fundamental Medium plus $ZnSO_4.7H_2O$ 3.3 mg./lit. (as Zn 0.75 p.p.m.).
7. Fundamental Medium plus $ZnSO_4.7H_2O$ 4.4 mg./lit. (as Zn 1.0 p.p.m.).
8. Fundamental Medium plus $ZnSO_4.7H_2O$ 8.8 mg./lit. (as Zn 2.0 p.p.m.).
9. Fundamental Medium plus $ZnSO_4.7H_2O$ 17.6 mg./lit. (as Zn 4.0 p.p.m.).
10. Fundamental Medium plus $ZnSO_4.7H_2O$ 70.4 mg./lit. (as Zn 16 p.p.m.).
11. Fundamental Medium plus $ZnSO_4.7H_2O$ 282 mg./lit. (as Zn 64 p.p.m.).
12. Fundamental Medium plus $ZnSO_4.7H_2O$ 1,128 mg./lit. (as Zn 256 p.p.m.).
13. Fundamental Medium plus $ZnSO_4.7H_2O$ 2,256 mg./lit. (as Zn 512 p.p.m.).
14. Fundamental Medium plus $ZnSO_4.7H_2O$ 4,512 mg./lit. (as Zn 1,024 p.p.m.).

Actual results of my experiments prove the fact that the yield rate of RNA is increased by the addition of zinc ion. Present knowledge about the effects of zinc ion on micro-organisms, particularly yeast, is limited to the extent that it is impossible to explain the abnormal high effects of zinc ion addition on the formation of RNA, but factual results prove this to be true. One of the achievements of my invention is the discovery of the existence of the close relationship between the zinc ion and the mechanism of biosynthesis of RNA.

I have further determined that the effects of the addition of zinc ion are not limited to any specific genus or species of yeast, but that such effects are common among

TABLE 4

| Strain Used | Time Elapsed | 11 Hours | | | | | 15 Hours | | | | |
|---|---|---|---|---|---|---|---|---|---|---|---|
| | Result | Residual Sugar (percent) | RNA Amount (mg./lit.) | Yield of RNA (percent) | Amount of Yeast (percent) | RNA Content (percent) | Residual Sugar (percent) | RNA Amount (mg./lit.) | Yield of RNA (percent) | Amount of Yeast (percent) | RNA Content (percent) |
| | Medium No.: | | | | | | | | | | |
| Saccharomyces cerevisiae | I | 0.44 | 237 | 0.93 | 0.44 | 5.4 | 0.10 | 216 | 0.74 | 0.50 | 4.3 |
| | II | 0.10 | 696 | 2.4 | 0.53 | 13.2 | 0.10 | 658 | 2.3 | 0.56 | 11.8 |
| Saccharomyces carlsbergensis | I | 0.74 | 212 | 0.94 | 0.35 | 6.1 | 0.26 | 52 | 0.76 | 0.40 | 5.2 |
| | II | 0.10 | 609 | 2.1 | 0.47 | 12.9 | 0.10 | 116 | 2.2 | 0.56 | 11.6 |
| Saccharomyces chevalieri | I | 0.34 | 242 | 0.91 | 0.39 | 6.2 | 0.16 | 225 | 0.79 | 0.46 | 4.9 |
| | II | 0.10 | 580 | 2.0 | 0.44 | 13.2 | 0.10 | 617 | 2.1 | 0.45 | 13.8 |
| Hansenula anomala | I | 1.08 | 392 | 2.0 | 0.74 | 5.3 | 0.10 | 271 | 0.94 | 0.52 | 5.2 |
| | II | 0.10 | 453 | 1.6 | 0.57 | 8.0 | 0.10 | 397 | 1.4 | 0.61 | 6.5 |
| Hansenula schnegii | I | 2.25 | 207 | 2.8 | 0.43 | 4.8 | 1.80 | 225 | 1.9 | 0.64 | 3.5 |
| | II | 2.00 | 326 | 3.3 | 0.34 | 9.2 | 0.21 | 733 | 2.6 | 0.92 | 8.0 |
| Rhodotorula glutinis | I | 2.90 | 60 | 6.0 | 0.10 | 5.9 | 2.80 | 151 | 7.6 | 0.27 | 5.6 |
| | II | 2.90 | 104 | 10.4 | 0.08 | 12.9 | 2.60 | 289 | 7.2 | 0.29 | 9.9 |
| Candida utilis | I | 1.44 | 451 | 2.9 | 0.55 | 8.2 | 0.10 | 476 | 1.6 | 1.33 | 3.6 |
| | II | 0.10 | 651 | 2.2 | 0.68 | 9.6 | 0.10 | 590 | 2.0 | 1.63 | 3.6 |

Note.—Composition Culture of Media:
I. Glucose 3.0%, Urea 0.3%, Ammonium sulfate 0.1%, $KH_2PO_4$ 0.15%, $MgSO_4.7H_2O$ 0.05%, $CaCl_2.2H_2O$ 0.025%, $Fe(NH_4)2(SO_4)2.6H_2O$ 4 mg./lit., $CuSO_4.5H_2O$ 0.3 mg./lit.
L(−)—asparagine 0.25%, Biotine 0.06 mg./lit., Calcium pantothenate 1.5 mg./lit., $B_1$—hydrochloride 13.2 mg./lit., Pyridoxine 3.6 mg./lit., Inositol 30 mg./lit.
II. I+$ZnSO_4.7H_2O$ 20 mg./lit.

sporogenous yeasts belonging to the genus Saccharomyces, Zygosaccharomyces, Hansenula, Pichia, Willia, etc., and asporogenus yeasts belonging to the genus Torula, Mycotorula, Torulopsis, etc. Table 4 shows the effects of zinc ion on yeasts of various kinds.

Moreover, the effects of addition of zinc ion is not limited to the addition of specific carbon sources, nutritive sources, etc., the methods of their supplies, the type of culture tanks, or the culture system, etc.

In addition to the above mentioned, even though ionized aluminum, manganese, cobalt, molybdenum, antimony, silver, tin, gold mercury, lead, etc., may be added, there is found no positive effect worth mentioning.

As regards the carbon source, in the case of substances other than glucose, the effect of zinc ion is the same. For example it is true in the case of cane sugar so long as the yeast to be used is not lacking the enzyme inverting cane sugar. As previously set forth, in the case of glucose media, with addition of zinc, the effects of mixing ions of iron, copper, etc., and the mixing of vitamins of various kinds, asparagine, sodium citrate, etc., may be noted to some extent. There is likewise some effect achieved by the intermixing of casamino-acid, corn-steep-liquor, soybean cake extracts, as indicated in Table 5. The effects of these additives is principally related to the increase in the rate of RNA formed as the result of shortening the period of inducing the growth of yeast and reducing the sugar consumption and culture time, as well as promoting the growth rate of yeast. But these additives were found almost totally ineffective for either increasing the yield rate or the RNA content, and thus their effects are believed

TABLE 5

| Time elapsed | 7 Hours | | | | | 9 Hours | | | | |
|---|---|---|---|---|---|---|---|---|---|---|
| Result | Residual Sugar (percent) | RNA Amount (mg./lit.) | RNA Yield (percent) | Amount of Yeast (percent) | RNA Content (percent) | Residual Sugar (percent) | RNA Amount (mg./lit.) | RNA Yield (percent) | Amount of Yeast (percent) | RNA Content (percent) |
| Medium No.: | | | | | | | | | | |
| 1 | 2.70 | 150 | 3.7 | 0.20 | 7.5 | 2.05 | 250 | 2.4 | 0.48 | 5.2 |
| 2 | 2.21 | 328 | 3.7 | 0.42 | 7.8 | 0.49 | 510 | 2.0 | 1.02 | 5.0 |
| 3 | 1.97 | 318 | 2.8 | 0.46 | 6.9 | 0.10 | 590 | 2.0 | 1.23 | 4.8 |
| 4 | 2.34 | 231 | 3.0 | 0.34 | 6.8 | 1.65 | 375 | 2.7 | 0.82 | 4.7 |
| 5 | 2.12 | 300 | 3.1 | 0.42 | 7.2 | 1.38 | 364 | 2.1 | 0.81 | 4.5 |
| 6 | 2.05 | 331 | 3.2 | 0.52 | 6.4 | 0.28 | 441 | 1.6 | 1.34 | 3.3 |
| 7 | 2.52 | 323 | 5.6 | 0.27 | 11.8 | 1.88 | 668 | 5.5 | 0.56 | 12.0 |
| 8 | 1.97 | 539 | 4.8 | 0.45 | 12.0 | 0.48 | 951 | 3.6 | 0.95 | 10.0 |
| 9 | 1.74 | 776 | 5.7 | 0.60 | 12.9 | <0.02 | 1,164 | 3.8 | 1.07 | 10.9 |
| 10 | 2.21 | 345 | 3.9 | 0.31 | 11.2 | 1.66 | 641 | 4.5 | 0.61 | 10.5 |
| 11 | 1.95 | 388 | 3.4 | 0.37 | 10.6 | 1.28 | 798 | 4.4 | 0.80 | 10.0 |
| 12 | 2.00 | 519 | 4.7 | 0.51 | 10.2 | 0.20 | 992 | 3.4 | 1.21 | 8.1 |

NOTE.—Composition of Respective Media—
Medium No.:
1. Fundamental medium I (Glucose 3.1%, Urea 0.30%, Ammonia sulfate 0.10% $KH_2PO_4$ 0.15%, $MgSO_4.7H_2O$ 0.05%, $CaCl_2.2H_2O$ 0.02%).
2. Fundamental medium I plus Corn-steep-liquor extract 0.05%.
3. Fundamental medium I plus Corn-steep-liquor extract 0.20%.
4. Fundamental medium I plus Soy-bean cake extract 0.05%.
5. Fundamental medium I plus Soy-bean cake extract 0.20%.
6. Fundamental medium I plus Casamino acid 0.20%.
7. Fundamental medium II (Fundamental medium plus $ZnSO_4.7H_2O$ 0.6 mg./lit.).
8. Fundamental medium II plus Corn-steep liquor extract 0.05%.
9. Fundamental medium II plus Corn-steep liquor extract 0.20%.
10. Fundamental medium II plus Soy-bean cake extract 0.05%.
11. Fundamental medium II plus Soy-bean cake extract 0.20%.
12. Fundamental medium II plus Casamino acid 0.20%.

to be substantially different from those of the zinc ion. However, it should be understood that the effects of their mixed uses may be utilized in the industrial embodiment of the present invention.

The measuring of zinc ion concentration in the culture liquor is usually performed by using the polarographic method, or by the quantitative colorimetric method, such as the Dithizone method, after the sample has been turned to ashes, then ionizing the ashes. Therefore, it is to be noted that the difference of ionic or non-ionic character of added zinc in the cultured broth cannot be detected from the present analytical method.

Table 6 indicates the relationship between the principal saccharine materials and the addition and non-addition of zinc ion. In almost genuine saccharine materials such as glucose, cane sugar, etc., the effect of the addition of zinc ion is remarkably notable. In saccharine materials containing impurities of various kinds such as saccharified liquor of wood, sulfite pulp waste liquor, molasses, etc., the effect of the zinc ion is not so significant as compared with genuine sugar. The zinc concentration obtained by the analytical result of the molasses material differs, depending upon the classification of the molasses. For example, when starting sugar concentration is 3%, the zinc con-

TABLE 6

| Medium | $ZnSO_4.7H_2O$ (p.p.m.) | Time Elapsed (Hour) | Amount of Residual Sugar (percent) | Amount of RNA (mg./lit.) | Yield of RNA (percent) | Amount of Yeast (percent) | RNA Content (percent) |
|---|---|---|---|---|---|---|---|
| Molasses | 0 | 6 | 0.29 | 768 | 3.9 | 1.07 | 7.2 |
| | | 8 | 0.22 | 694 | 3.4 | 1.22 | 5.7 |
| | 18 | 6 | 0.29 | 1,000 | 5.1 | 0.98 | 10.2 |
| | | 8 | 0.22 | 996 | 4.9 | 1.04 | 9.6 |
| Sulfite Pulp Waste Liquor | 0 | 8 | 1.90 | 323 | 8.1 | 0.14 | 23.3 |
| | | 10 | 1.59 | 561 | 7.9 | 0.44 | 12.7 |
| | 20 | 8 | 1.85 | 426 | 9.4 | 0.16 | 26.5 |
| | | 10 | 1.43 | 765 | 8.8 | 0.43 | 16.8 |
| Saccharified Liquor of Wood | 0 | 8 | 1.30 | 703 | 4.1 | 0.83 | 8.5 |
| | | 10 | 0.81 | 818 | 3.7 | 1.05 | 7.8 |
| | 10 | 8 | 1.25 | 961 | 5.5 | 0.84 | 11.4 |
| | | 10 | 0.75 | 1,175 | 5.2 | 1.02 | 11.4 |

Strain Used: *Candida utilis*.
Molasses Medium: Sugar concentration 2.25%, Urea 0.29%, Ammonia sulfate 0.07%, Phosphoric acid 0.3%.
Sulfite Pulp Waste Liquor Medium: Sugar concentration 2.30%, Urea 0.3%, Ammonium sulfate 0.07%, Phosphoric acid 0.3%.
Saccharified Liquor of Wood: Sugar concentration 3.0%, Urea 0.3%, Ammonium sulfate 0.07%, Phosphoric acid 0.3%, Corn-steep-liquor 0.15%.

centration is mainly 0.5–2.0 p.p.m. The reasons why satisfactory effects of zinc ion addition are found in molasses media containing fairly sufficient concentration of zinc are not clear. One hypothesis is that zinc in the molasses is present in a difficult state of utilization in culture process and the zinc ion concentration in the broth is insufficient. The other is that added zinc ion inactivates by precipitation of some substance in molasses which inhibits formation of RNA. In either case, it is to be understood that whereas the addition of zinc ion has almost no influence upon the growth rate in various kinds of saccharine material media, the addition of zinc exhibits significant effect on the production of RNA.

The relationship between the addition and non-addition of zinc ion and the phosphoric acid concentration is shown in Table 7. The effect of addition of zinc may be seen with molasses of different origins. In order to achieve a high yield rate of RNA, it will be noted that the phosphoric acid concentration is insufficient at 0.10%, and is preferably over 0.15%. RNA may be effectively produced by combining the zinc ion concentration and the phosphoric acid concentration.

The above descriptions dealt with the effects of addition of zinc ion under higher Kd condition in the batch system culture by means of saccharine media of various kinds. However, these effects are not limited to the batch-system culture, but they may be exhibited entirely in the same manner in other culture systems, such as semi-continuous system (feeding culture, etc.), continuous system, etc.

The essential point in the economy of RNA production by a continuous process may well be expressed by the yield of RNA, and productive efficiency of definite facilities. In this invention, the yield rate of RNA ($Y_R$) can be calculated by multiplying the yield rate of yeast ($Y_X$) by the content of RNA (R). On the other hand, it is natural that the production efficiency of RNA ($\mu VXR$) has a significant relationship with the growth rate of yeast ($\mu$), the volume of liquor in the tank (V), the concentration of yeast (X) and the content of RNA (R). Therefore, in the economical production of RNA, it is desirable to increase $Y_X$, R, $\mu$, V, and X as much as possible.

TABLE 7

| Origin of Molasses | $H_3PO_4$ (percent) | $ZnSO_4 \cdot 7H_2O$ (p.p.m.) | Residual Sugar (percent) | RNA Amount (mg./lit.) | Yield of RNA (percent) | Amount of Yeast (percent) | RNA Content (percent) |
|---|---|---|---|---|---|---|---|
| India | 0.1 | 18 | 0.28 | 797 | 4.0 | 1.07 | 7.5 |
| | 0.15 | 18 | 0.27 | 1,066 | 5.3 | 1.04 | 10.3 |
| | 0.3 | 18 | 0.27 | 1,032 | 5.1 | 0.98 | 10.5 |
| | 0.3 | 0 | 0.25 | 988 | 4.9 | 1.02 | 9.7 |
| Indonesia | 0.1 | 18 | 0.22 | 767 | 3.8 | 1.04 | 7.4 |
| | 0.15 | 18 | 0.20 | 1,070 | 5.2 | 1.06 | 10.2 |
| | 0.3 | 18 | 0.22 | 1,118 | 5.5 | 1.11 | 10.1 |
| | 0.3 | 0 | 0.21 | 889 | 4.4 | 1.13 | 7.9 |
| Philippines | 0.1 | 18 | 0.25 | 815 | 4.1 | 1.04 | 7.8 |
| | 0.15 | 18 | 0.22 | 1,068 | 5.3 | 1.05 | 10.1 |
| | 0.3 | 18 | 0.23 | 1,118 | 5.6 | 1.13 | 9.9 |
| | 0.3 | 0 | 0.22 | 888 | 4.4 | 1.13 | 7.9 |

The value as when 8 hours have passed.
Fundamental Medium: Starting sugar concentration (Indian molasses 2.28%, Indonesian molasses 2.26%, Philippine molasses 2.23%). Urea 0.29%, ammonium sulfate 0.07%, $Fe(NH_4)_2(SO_4)_2 \cdot 6H_2O$ 4 mg./lit., $CuSO_4 \cdot 5H_2O$ 1.2 mg./lit.
Strain: *Candida utilis*.

Table 8 shows the relationship between Kd and zinc ion. It is to be noted that when Kd is below $10 \times 10^{-6}$, the effect of zinc ion on production of RNA is relatively insignificant whereas in the case of Kd over $10 \times 10^{-6}$, it is shown that zinc ion has a marked effect on the yield of RNA and the rate of its formation. In higher conditions of Kd, this effect incorporates those effects upon the yield rate of yeast and the rate of its growth. However, it is obvious that the added zinc directly takes effect as a strong stimulus, as may be seen by the noted increased RNA content.

Among these 5 kinds of indexes, the techniques to promote $Y_X$, $\mu$, V, and X, are substantially the same as those techniques of yeast culture utilized for foodstuffs or feedstuffs. Hence, in the present invention, explanations will further be made in relation to the effects of the invention on the 5 items—namely, $Y_X$, R, $Y_R$, $\mu$, and $\mu VXR$. The classification of the yeast, raw materials, and their culture conditions, which can be used in the present continuous culture, are substantially those which may be assumed from the batch culture system, there being no substantial difference.

TABLE 8

| Kd | Medium | Time Elapsed (Hour) | Residual Sugar (Percent) | Content of RNA (mg./lit.) | Yield of RNA (percent) | Amount of Yeast (percent) | Content of RNA (percent) |
|---|---|---|---|---|---|---|---|
| $3.2 \times 10^{-6}$ | I | 6.5 | 0.72 | 612 | 4.0 | 0.81 | 7.6 |
| | | 8.0 | 0.29 | 715 | 3.6 | 0.98 | 7.3 |
| | II | 6.5 | 0.65 | 623 | 3.9 | 0.79 | 7.9 |
| | | 8.0 | 0.28 | 712 | 3.7 | 1.04 | 6.9 |
| $7.8 \times 10^{-6}$ | I | 6.5 | 0.65 | 698 | 4.9 | 0.84 | 8.3 |
| | | 8.0 | 0.29 | 772 | 4.4 | 1.01 | 7.7 |
| | II | 6.5 | 0.45 | 823 | 5.4 | 0.81 | 10.1 |
| | | 8.0 | 0.28 | 807 | 4.6 | 1.02 | 8.0 |
| $13.2 \times 10^{-6}$ | I | 6.5 | 0.56 | 737 | 4.4 | 0.80 | 9.2 |
| | | 8.0 | 0.22 | 885 | 4.4 | 1.13 | 7.9 |
| | II | 6.5 | 0.69 | 962 | 6.2 | 0.76 | 12.7 |
| | | 8.0 | 0.23 | 1,120 | 5.6 | 1.14 | 9.9 |

NOTE:
Strain Used: *Candida arborea*.
Medium: (I) Molasses (as sugar) 2.25%, Urea 0.3%, $KH_2PO_4$ 0.30%, Ammonium sulfate 0.10%.
(II) I + $ZnSO_4 \cdot 7H_2O$ 15 mg./lit.

As indicated in Table 9, in continuous culture, under an aerobic condition with Kd over $1.0 \times 10^{-5}$, when the concentration of added zinc ion in the feeding liquor is maintained over 0.25 p.p.m., $Y_X$ and $\mu$ will show almost no change, but the content of RNA will markedly increase. Along with the known fact that $Y_X$ and $\mu$ will show good results under a condition of high Kd, significant effects will also be seen with respect to the indexes of $Y_R$, and $\mu VXR$.

In Table 10, there are shown examples of continuous cultures by the use of saccharified liquor of wood, sulfite pulp waste liquor, and waste molasses of cane sugar. As shown in this table, the effect of the addition of zinc ion is significant in saccharified liquor of wood and sulfite pulp waste liquor, as compared with molasses. It is believed that the reason why the effect is diminished in the case of molasses is that the activity of effect of the zinc ion may have been lowered owing to various impurities contained in the molasses raw material.

The following are some examples of the carrying out of my invention, by tank culture. It is to be understood that my invention is not limited by these examples, but they are given only as exemplary methods of the practicing of my invention.

*Example 1*

In a stainless steel aeration-agitation culture tank of 200 lit. capacity, a medium composed of glucose 5.0%, urea 0.2%, ammonium sulfate 0.1%, phosphoric acid 0.2%, 0.2% soy-bean powder extract, and magnesium sulfate .7H$_2$O 0.05% (zinc sulfate .7H$_2$O was not added in one sample, but was added for 5.0 p.p.m. to the other sample), was prepared and sterilized, to which 1.2 lit. flask shake-culture liquor or *Candida arborea* was inoculated, and under the condition of agitation at 150 r.p.m., and aeration at 100 lit./min. (Kd=$25.9 \times 10^{-6}$), culture was performed. While pH was being adjusted to 4.5 with caustic soda and sulfuric acid when it overstepped the range of 4.5–5.0, the residual sugar, concentration of yeast and content of RNA were measured at definite time intervals so as to follow up the progress of culture. The concentration of yeast reached a maximum in 12–13 hours irrespective as to addition of zinc ion. Although almost no difference was noted with the maximum yeast concentration,

TABLE 9

| Kd | Zn ion (p.p.m.) | $Y_X$ (Percent) | R (percent) | $Y_R$ (percent) | R | $\mu VXR$ (Kg./m.$^3$/Hr.) |
|---|---|---|---|---|---|---|
| $3.2 \times 10^{-6}$ | 0.125 | 35.6 | 5.4 | 1.9 | 0.28 | 0.302 |
| $3.2 \times 10^{-6}$ | 0.25 | 37.2 | 6.0 | 2.2 | 0.30 | 0.360 |
| $3.2 \times 10^{-6}$ | 0.50 | 35.2 | 6.4 | 2.3 | 0.28 | 0.358 |
| $6.2 \times 10^{-6}$ | 0.125 | 43.6 | 5.9 | 2.6 | 0.34 | 0.401 |
| $6.2 \times 10^{-6}$ | 0.25 | 44.8 | 5.5 | 2.5 | 0.32 | 0.352 |
| $6.2 \times 10^{-6}$ | 0.50 | 46.1 | 6.1 | 2.8 | 0.32 | 0.390 |
| $10.6 \times 10^{-6}$ | 0.125 | 53.1 | 5.1 | 2.7 | 0.34 | 0.347 |
| $10.6 \times 10^{-6}$ | 0.25 | 52.6 | 7.6 | 4.0 | 0.36 | 0.547 |
| $10.6 \times 10^{-6}$ | 0.50 | 53.0 | 10.1 | 5.4 | 0.33 | 0.667 |
| $26.8 \times 10^{-6}$ | 0.125 | 56.1 | 5.3 | 3.0 | 0.42 | 0.445 |
| $26.8 \times 10^{-6}$ | 0.25 | 53.1 | 7.8 | 4.1 | 0.43 | 0.671 |
| $26.8 \times 10^{-6}$ | 0.50 | 52.8 | 10.1 | 5.3 | 0.43 | 0.869 |

Strain Used: *Candida arborea*.
Supplied Liquor: Fundamental Composition: Glucose 5–7%, Asparagine 0.1%, Urea 0.3%, Phosphoric acid 0.15%, KCL 0.1%, MgSO$_4$.7H$_2$O 0.10%, CaCl$_2$.2H$_2$O 0.04%. An to be added as ZnSO$_4$.7H$_2$O.
Yeast Concentration: Amplitude of Variations 1.8–2.2%, X of $\mu VXR$ is to be calculated as 2.9%.
Volume of Liquor in the Tank: to be calculated as 1 m$^3$.

TABLE 10

| Medium | Zn ion Added (p.p.m.) | $Y_X$ (percent) | R (percent) | $Y_R$ (percent) | $\mu$ | $\mu VXR$ (kg./m.$^3$/Hr.) | Percentages $Y_R$ (percent) |
|---|---|---|---|---|---|---|---|
| Saccharified Liquor of Wood | Control | 54.3 | 7.2 | 3.9 | 0.31 | 0.335 | (100) |
| | 0.5 | 55.9 | 9.8 | 5.5 | 0.31 | 0.456 | 140 |
| | 5.0 | 53.3 | 10.3 | 5.5 | 0.32 | 0.484 | 140 |
| | 50.0 | 52.1 | 10.6 | 5.5 | 0.30 | 0.477 | 141 |
| Sulfite Pulp Waste Liquor | Control | 46.1 | 6.9 | 3.2 | 0.33 | 0.342 | (100) |
| | 0.5 | 47.5 | 9.6 | 4.6 | 0.32 | 0.461 | 143 |
| | 5.0 | 47.6 | 11.8 | 5.6 | 0.35 | 0.620 | 177 |
| | 50.0 | 45.2 | 11.3 | 5.1 | 0.33 | 0.559 | 161 |
| Cane Sugar Waste Molasses | Control | 56.3 | 8.6 | 4.8 | 0.41 | 0.529 | (100) |
| | 0.5 | 54.2 | 10.6 | 5.7 | 0.43 | 0.684 | 119 |
| | 5.0 | 53.6 | 11.8 | 6.3 | 0.40 | 0.708 | 131 |
| | 50.0 | 56.2 | 10.9 | 6.1 | 0.42 | 0.687 | 127 |

Strain Used: *Candida utilis*.
Composition of the Supplied Liquor (Sugar Concentration 3–5%).
1. Saccharified Liquor of Wood: Corn-steep-liquor 0.2%, Urea 0.2%, Potassium phosphate 0.15%, MgSO$_4$.7H$_2$O 0.05%, CaCl$_2$.2H$_2$O 0.04%.
2. Sulfite Pulp Waste Liquor: Soy-bean cake extract 0.2%, Urea 0.3%, Potassium phosphate 0.20%, MgSO$_4$.7H$_2$O 0.05%, CaCl$_2$.2H$_2$O 0.04%.
3. Molasses Liquor of Philippine Origin: Urea 0.2%, Phosphoric acid 0.2%, Ammonium sulfate 0.1%.
Yeast Concentration: 1.3–1.6%, X of $\mu VXR$ is to be calculated as 1.5%.
Volume of Liquor in the Tank: To be calculated as 1 m$^3$.

The content and technical meaning of my invention is clear from the foregoing description. It is obvious that my invention therefore teaches a method for the production of yeast which contains RNA in a high concentration, thereby providing a method whereby RNA may be economically produced.

curve of sugar consumption and growth rate, the RNA content of the section with zinc ion added indicated 11.0%, whereas that of the section without addition of zinc ion was 7.2%.

To each of the said yeast (corresponding to 1 kg. as dried product), was added 20 lit. of 0.5% NaCl water which was boiled, then extracted at 100° C. for 2 hours. After concentrating the separated supernatant liquor, the extract was subjected to the alcohol treatment. From the former, 69 g. (RNA conent: 79%) of crude RNA was obtained, and from the latter, 102 g. of crude RNA (RNA content: 82%) was yielded.

*Example 2*

In a stainless aeration-agitation culture tank with a 200 lit. capacity, the effects of addition of zinc ion were examined with molasses of Siamese origin, Philippine origin, and the saccharified liquor of wood from needle-leaved tree. In the instance of a starting sugar concentration of 3.0%, the zinc concentration deriving from the said raw materials were calculated to be 1.3 p.p.m., 0.8 p.p.m. and 0.6 p.p.m., respectively. The said raw materials were prepared into culture media for 120 lit. each section at a sugar concentration of 3.0% with addition of ammonium sulfate 0.05% and phosphoric acid 0.15%, and then zinc sulfate .7H$_2$O was added for 14 p.p.m. in one section and was not added for another section of the said saccharine materials respectively. After sterilization, 0.6 lit. of flask cultured liquor of *Candida utilis* was implanted to respective media of 120 lit. each, and culture was carried out under the condition of agitation at 222 r.p.m. and aeration at 100 lit./min. (Kd=43.5×10$^{-6}$). pH of the media was controlled with ammonia and sulfuric acid to pH 4.8 as the standard.

The principal effects obtained with respective raw materials were as shown in the following tables:

| | Zinc Sulfate 7H$_2$O (p.p.m.) | Time Required to Reach Max. Yeast Concentration (Hr.) | Max. Yeast Concentration (percent) | RNA Content (percent) | Residual Sugar (percent) |
|---|---|---|---|---|---|
| Molasses of Siamese Origin | 0 | 9.5 | 1.42 | 9.2 | 0.21 |
| | 14 | 10.0 | 1.48 | 11.6 | 0.22 |
| Molasses of Origin of Philippines | 0 | 10.0 | 1.52 | 8.9 | 0.18 |
| | 14 | 10.0 | 1.51 | 11.5 | 0.18 |
| Saccharified Liquor of Wood | 0 | 13.0 | 1.32 | 7.6 | 0.31 |
| | 14 | 13.5 | 1.29 | 10.9 | 0.33 |

From these culture liquor, the mycelia were separated in the identical manner to Example 1, from which RNA was collected by extraction.

*Example 3*

In a stainless aeration-agitation tank with 400 lit. capacity, the effects of addition of zinc ion was examined by carrying out continuous culture with the molasses of Indian origin. The composition of the culture liquor supplied was sugar concentration 6.0%, ammonium sulfate 0.2%, and potassium monophosphate 0.45%. The yeast used was *Candida guilliermondii*, and the culture condition was agitation at 200 r.p.m., and the volume of aeration, 240 lit./min. The pH of the medium was adjusted by the addition of ammonia centering around pH 5.5. By conducting control so that the yeast concentration in the culture liquor will be 2.5%±0.3%, the results obtained from the measured values at 2 hour intervals of the average continuous culture time of 20 hours, are shown as the mean values below:

| Zinc Sulfate.7H$_2$O (p.p.m.) | Yield of yeast relative to consumed sugar (percent) | RNA Content (percent) | Growth rate |
|---|---|---|---|
| 0 | 50.2 | 8.5 | 0.39 |
| 2 | 52.1 | 9.6 | 0.38 |
| 10 | 54.6 | 11.2 | 0.41 |
| 30 | 52.1 | 1.6 | 0.39 |

From this extract, yeast was separated, from which RNA was collected by extraction in the same manner as Example 1.

Various changes may be made to the methods herein described, without departing from the spirit of the invention or the scope of the following claim.

I claim:

A process for producing yeast ribonucleic acid which comprises culturing a yeast in an aqueous nutrient medium under aerobic conditions wherein the oxygen absorption coefficient is at least 10×10$^{-6}$, the aqueous nutrient medium being artifically supplemented by zinc ion at a concentration of at least 0.25 p.p.m. and having a phosphate ion concentration of at least 0.15% by weight, and extracting and recovering ribonuclei acid from the yeast.

References Cited by the Examiner

UNITED STATES PATENTS 3,163,638  12/1964  Miwa et al. _____ 195—28

OTHER REFERENCES

Cook, The Chemistry and Biology of Yeast, Academic Press Inc., New York, 1958, pages 183 and 296 to 305.

A. LOUIS MONACELL, *Primary Examiner.*

ALVIN E. TANENHOLTZ, *Assistant Examiner.*